2,180,512

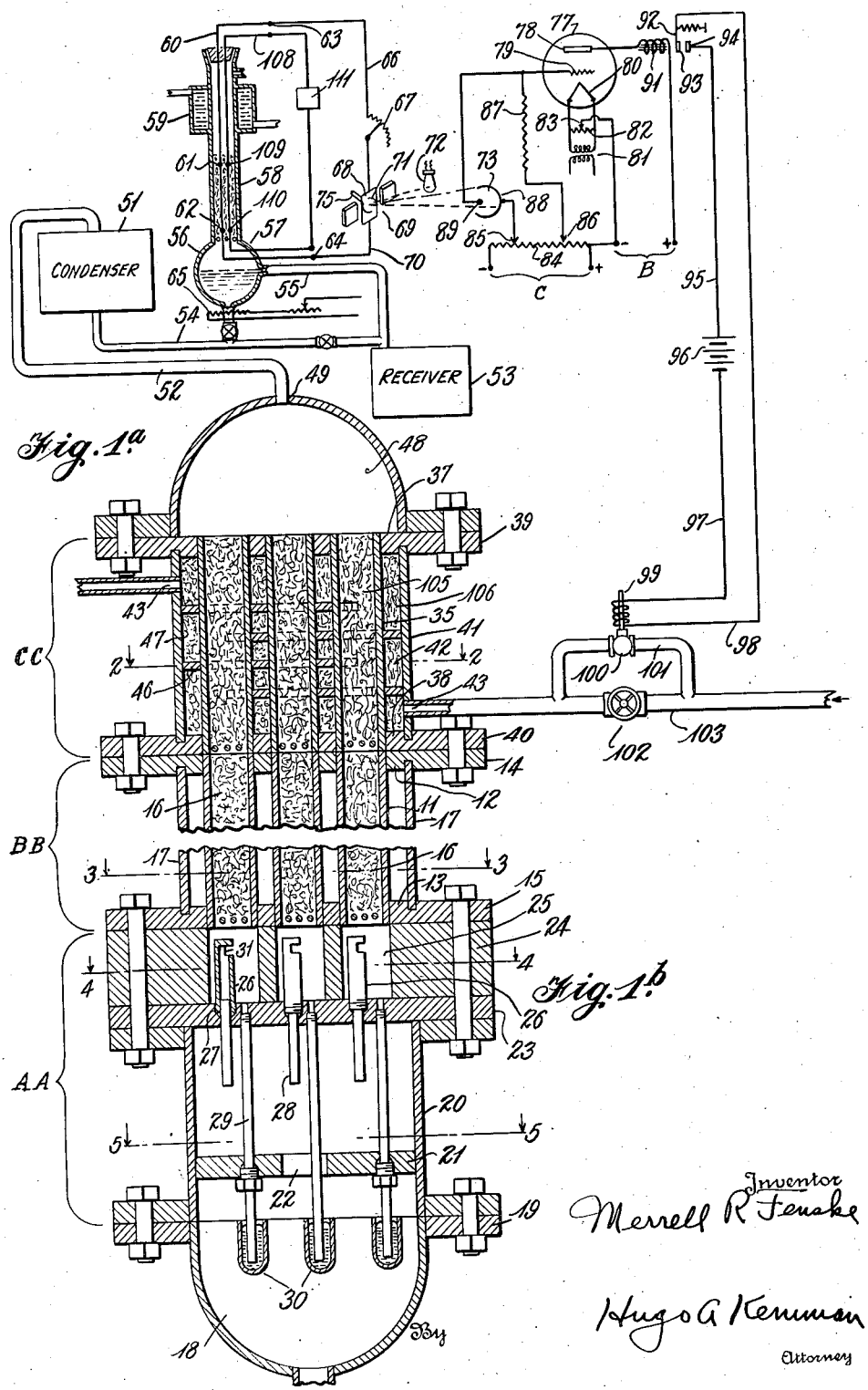
Nov. 21, 1939.  M. R. FENSKE  2,180,512
PROCESS AND APPARATUS FOR FRACTIONATING
Filed Aug. 7, 1937  2 Sheets-Sheet 1
Fig. 1.ᵃ
Fig. 1.ᵇ
Merrell R. Fenske, Inventor
Hugo A. Kenman, Attorney Nov. 21, 1939.  M. R. FENSKE  2,180,512
PROCESS AND APPARATUS FOR FRACTIONATING
Filed Aug. 7, 1937  2 Sheets—Sheet 2
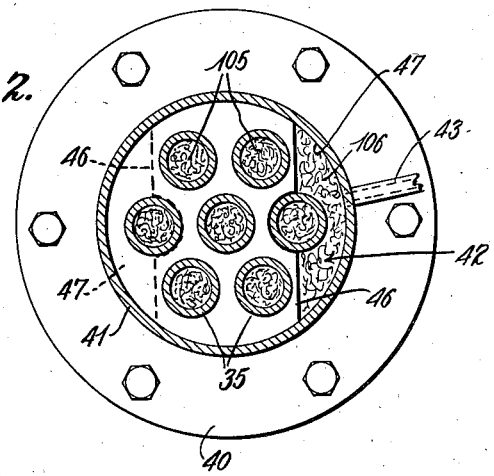
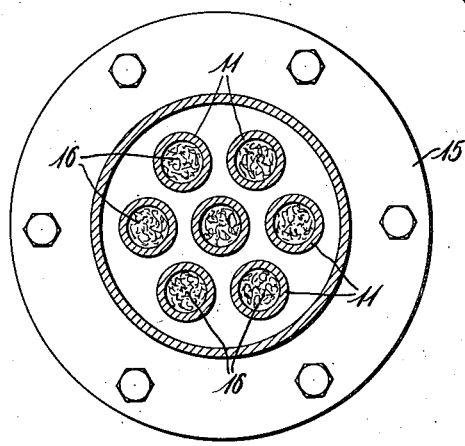
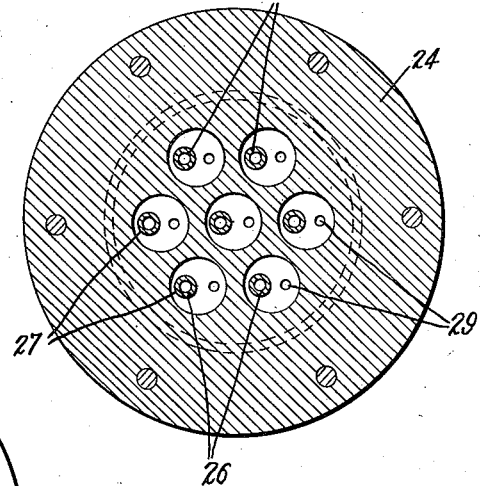
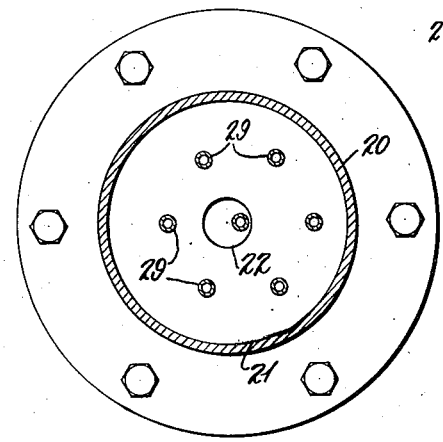
Merrell R. Fenske, Inventor
By Hugo A. Kenman, Attorney Patented Nov. 21, 1939

UNITED STATES PATENT OFFICE 2,180,512

PROCESS AND APPARATUS FOR FRACTIONATING

Merrell R. Fenske, State College, Pa., assignor to The Pennsylvania Research Corporation, State College, Pa., a corporation of Pennsylvania Application August 7, 1937, Serial No. 157,926

9 Claims. (Cl. 196—94)

This invention pertains to a method and apparatus for fractional distillation.

In copending application, Serial No. 157,925, filed August 7, 1937, by Merrell R. Fenske, there is described and claimed a method and apparatus for fractional distillation wherein high efficiencies are obtained by effectually contacting ascending vapors with descending reflux without serious channeling. This is accomplished generally speaking by conducting the reflux down through the zone of contact with ascending vapors in film form and in separate streams over a plurality of attenuated packing members.

In one species in said copending application the packing members are separately enclosed, for instance, by tubes having relatively small cross sections of any desired geometrical shape so that the ascending vapors are brought into efficient contact with the descending reflux in a plurality of separate countercurrently flowing streams or in other words in a plurality of separate fractionating units.

In said copending application the ascending vapors and/or descending reflux may be metered into each unit in a manner so that the rectified vapors produced by any one unit will be of substantially the same composition as the rectified vapors produced by any other unit.

This invention comprises an improvement over said copending application in that the amount of descending reflux in each fractionating unit is dependent upon the operation of the least efficient fractionating unit. In other words the least efficient fractionating unit operates with a reflux ratio sufficiently high so that the composite product has the desired temperature spread. Consequently the reflux ratios obtaining in the remaining tubes will vary so that the composite rectified vapors will be within the desired temperature spread.

Further features of the invention reside in the construction, arrangement and combination of parts, and in the steps, combinations of steps and sequences of steps, all of which, together with other features, will become more apparent to persons skilled in the art as the specification proceeds and upon reference to the drawings in which:

Figures 1a and 1b comprise a sectional elevation (shown broken) illustrating the invention;
Figure 2 is a section on line 2—2 of Figure 1a;
Figure 3 is a section on line 3—3 of Figure 1b;
Figure 4 is a section on line 4—4 of Figure 1b; and
Figure 5 is a section on line 5—5 of Figure 1b.

For convenience in description, tower 10 will be referred to as being made up of sections AA, BB, and CC.

Section BB, a part of which is shown in Figure 1a and another part in Figure 1b, comprises a plurality of tubular members 11 having their ends mounted in tube sheets 12 and 13. Tube sheets 12 and 13 are illustrated for convenience as being integral with flanges 14 and 15 respectively. Tubes 11 may have a cross section of any desired geometrical configuration and up to certain limits of any desired cross sectional area. The cross section of tubes 11 is preferably limited to an area sufficiently small to prevent serious channeling after the contacting means, for instance packing 16, has been arranged therein.

The preferable limiting cross sectional area for tubes 11 will be not only a function of the type of packing employed since certain forms will as a rule permit the use of a larger cross section without an inordinate falling off of efficiency than other forms but also of the degree of uniformity of distribution of the packing in the tube.

For this reason a definite preferred limit in cross sectional area cannot be given. However, it is easy of determination, for instance by testing the efficiency of a single tube by any approved method, for instance as set forth in Industrial and Engineering Chemistry, November 1934, page 1169.

It may be stated as a general rule that one should proceed with caution after exceeding a cross sectional area of about three square inches although, as shown in the article just referred to, larger cross sectional areas may in some cases be employed without an inordinate loss of efficiency.

Tubes 11 are illustrated as being surrounded by a shell 17 which is secured to flanges 14 and 15. Shell 17 may be lagged to make the contacting section of the tower adiabatic. However, the lagging may be applied directly to each tube or may include all of the tubes if desired. Any other means may be substituted.

Section BB is a phase contacting section and functions as such.

Below section BB is section AA.

Among the functions of section AA is that of metering vapors into the tubes 11. These vapors flowing from a still or other source enter the tower through a chamber 18 which is shown attached to the lower end of section AA as illustrated at 19.

The lower portion of section AA is illustrated as comprising a shell 20 in which is disposed a vapor mixing plate 21 having an opening 22 at its center.

Transverse plate 23 contacts the top of shell 20. Immediately above plate 23 is member 24 which in turn contacts header 13.

Member 24 has a plurality of vertically arranged chambers 25 of the same number as the tubes 11. Each chamber 25 communicates with a tube 11 at its lower end.

Within each chamber 25 is a hollow plug 26 which is shown threaded at 27 into plate 23. The lower end of plug 26 holds the upper end of a metering tube 28 which projects down into shell 20.

A reflux drain tube 29, shown with its upper end secured in plate 23, extends downwardly from each chamber 25 and through plate 21 into chamber 18. Each tube 29 is provided with a cup 30 about its lower end for purposes which will hereinafter appear.

Section CC is disposed above section BB.

Section CC comprises a plurality of individual condensers. These condensers correspond in number to the tubes 11. As illustrated, each condenser comprises a tubular member 35 which communicates at its lower end with a separate tube 11 of section BB.

Tubular members 35 are illustrated as being mounted in headers 37 and 38. Headers 37 and 38 are illustrated for convenience as being integral with flanges 39 and 40 respectively. A shell 41 surrounds tubes 35 and contacts flanges 39 and 40 to form a chamber 42 for heat exchange purposes.

Shell 41 is illustrated as having openings 43 for the circulation of a cooling fluid through the chamber 42. For effective distribution of the cooling fluid, baffles 46 each forming an opening 47 with shell 41, are shown arranged in spaced relationship in chamber 42 with the openings 47 staggered so as to cause the cooling fluid to flow back and forth through the chamber 42 as it passes therethrough.

The upper ends of tubes 35 open into chamber 48 which has an opening 49 for the removal of rectified vapors.

Condenser 51 is connected to vapor outlet 49 by a vapor line 52 and product receiver 53 is connected to condenser 51 by product line 54.

A bypass 55 is connected to line 54 in which is connected still 56 of a small distilling unit 57 the arrangement being such that a small sample of the product flows through still 56 preferably continuously and then back to line 54 or receiver 53.

Distilling unit 57 besides still 56 comprises a small fractionating tower 58 and a condenser 59. Tower 58 may have any desired number of theoretically perfect plates, say for instance from six to ten.

A thermocouple 60 is shown threaded through column 58 with junctions 61 and 62 positioned at the top and bottom of the column respectively and ending outside of column 58 at terminals 63 and 64. The remainder of the circuit as shown comprises wire 66, rheostat 67, coil 68 of galvanometer 69 and wire 70.

Galvanometer 69 is of a well-known type and is illustrated diagrammatically. An essential feature of galvanometer 69 is that coil 68 rotates in response to and through an arc proportional to quantum of current flow and returns to its original position upon the cessation of such flow. Coil 68 carries a mirror 71 which is adapted to reflect a beam of light from a light source 72 in the general direction of photoelectric cell 73 said beam being directed on and off of said cell depending upon the position of coil 68.

Since it is desired to concentrate the beam on the photoelectric cell for all values of current above a certain point a stop 75 is provided for limiting the rotation of coil 68 said stop limiting the rotation of coil 68 in a manner to obtain these results.

Cell 73 is a part of a vacuum tube relay circuit. This circuit comprises a three-element tube 77 having a plate 78, a grid 79, and a filament 80. The filament is illustrated as being supplied with alternating current from a transformer 81 for the purposes of heating. The conventional potentiometer 82 with sliding tap 83 is shown connected across the filament terminals, the tap being connected to the minus-B terminal.

The input circuit includes a potentiometer 84 connected across a suitable voltage source with the plus terminal connected to the filament through tap 83 and potentiometer 82. Potentiometer 84 has two sliding taps 85 and 86, taps 85 being connected to grid 79 through cell 73, and tap 86 being connected to grid 79 through the grid leak 87. Tap 85 is directly connected to the cathode 88 of cell 73, and grid 79 is directly connected to anode 89 of cell 73. The particular photoelectric cell illustrated is of the photoemissive type.

A relay 91 is connected in the output circuit and is operated thereby. As illustrated armature 92 breaks a circuit through contacts 93 and 94 when the relay is energized and makes a circuit through these contacts when the relay is deenergized.

The circuit of contacts 93 and 94 comprises wire 95, battery 96, wire 97, solenoid 99, wire 98, and armature 92.

Solenoid 99 operates valve 100 in bypass 101 around valve 102 in line 103 which supplies cooling fluid to chamber 42 for the operation of condensers 35.

Assuming that the individual fractionating units 11 and condensers 35 are at least substantially equally matched as to capacity and efficiency, the operation of the invention is as follows:

Vapors enter chamber 18 from a still or other source and are thoroughly mixed as they pass through opening 22 in plate 21.

These vapors are metered into plugs 26 by metering tubes 28 which, under the assumed conditions, may be of equal capacity although adjustments may be made, for instance, by making metering tubes 28 interchangeable to compensate for inequalities in the fractionating units 11 as will appear hereinafter.

Plugs 26 are provided with openings 31 in their side faces to permit the vapors to escape into chambers 25 and to prevent descending liquid from entering the metering tubes 28. From each chamber 25 the vapors pass up through the corresponding tube 11 wherein the desired rectification takes place.

When tubes 11 are packed and especially when the packing is continuous, the phases will contact each other essentially in film form. Depending upon the rate of reflux flow, the reflux, which is conducted down through each tube over the packing medium, will be maintained either entirely in film form or with a portion alternately in film and drop form. The latter also affords efficient fractionation because of a sort of kneading action caused by the drops recontacting the packing and respreading out into films only to be followed by the formation of more drops. This brings a large proportion of the liquid particles to the surface for contact with ascending vapors.

Rectified vapors escaping from the upper ends of tubes 11 enter the corresponding condensers 35 wherein fractional condensation is effected, the condensate in each condenser 35 flowing back into the corresponding tube 11 as reflux condensate and the uncondensed vapors escaping into chamber 48 wherein all of said vapors commingle.

The liquid that flows out of each tube 11 at its bottom collects in the corresponding chamber 25 and drains down into chamber 18 through the corresponding tube 29.

The purpose of cups 30 is to form a liquid seal to prevent vapors from ascending through tubes 29. Since there will be a pressure drop between chamber 18 and chambers 25, liquid will rise in tubes 29 and will stand at a certain height therein depending upon the pressure drop. Cups 30 are preferably of sufficient capacity to furnish the required amount of liquid for tubes 29 at the time of starting, thus making it unnecessary to depend upon descending reflux for this purpose. Thus the tower will reach equilibrium conditions in a shorter length of time.

If desired any differences in the individual fractionating units 11 may be compensated for by adjusting the vapor flow to each unit by interchanging metering tubes 28. This might also be done to a certain extent without an interchange of tubes 28 by making the pressure drop through tubes 28 relatively large, for instance, at least five times the average resistance to vapor flow through the individual fractionating units. In the latter case, in view of the relatively larger pressure drop through the metering tubes 28 any small differences between individual units 11 are minimized.

Vapors collecting in chamber 48 escape through 49 and are condensed in condenser 51. The condensate flows through line 54 directly to receiver 53 except that portion which flows by means of by-pass 55 through still 56. The product in still 56 is thus continuously replaced.

The liquid in still 56 is kept at a boil by any suitable means, for instance, by heating element 65. Vapors thus produced ascend through column 58 wherein they are rectified with the resulting concentration of components of different composition at different points in the rectification zone, provided, of course, that the product is not a constant boiling substance.

Components of relatively higher boiling point will concentrate at the bottom of column 58 and components of relatively lower boiling point will concentrate at the top of tower 58. The temperature differential between the top and bottom of tower 58 is a measure of the difference in composition or, in other words, is a measure of the temperature spread of the product.

This temperature differential may be availed of to control the degree of fractional condensation effected in condensers 35 so as to increase the volume of vapors condensed with increase in temperature differential and to decrease the volume of vapors condensed with decrease in temperature differential. Thus the product may be made to have the desired temperature spread.

This temperature spread may be of any desired value starting with zero which is the temperature spread of a constant boiling substance.

The operation of the circuit for controlling the condensing effect of condensers 35 in accordance with the temperature differential between junctions 61 and 62 is as follows:

A difference in temperature between points 61 and 62 generates an electromotive force which in turn causes current flow through coil 68 of galvanometer 69. As a result coil 68 will rotate through an arc proportional to the quantum of current flow. Whether or not the reflected beam of light will be focused on cathode 88 of photoelectric cell 73 will depend upon the value of the temperature differential and the adjustment of the circuit. The circuit is adjusted by means of rheostat 67 which controls the amount of current for any given temperature differential. The adjustment is such that the beam of light will be focused on cathode 88 when and as long as the desired temperature spread is exceeded.

The relay circuit is so arranged and adjusted that when cathode 88 is not energized by the beam of light, sufficient current will flow through the output circuit to operate relay 91 to hold contacts 93 and 94 apart. This permits valve 100 to assume a closed position to prevent cooling fluid from passing through bypass 101. The size of this current in the output circuit may be adjusted at tap 86 which controls the normal grid bias.

The setting of valve 102 is such that when valve 100 is closed the cooling fluid supplied to chamber 42 is slightly below requirements.

Now, let us assume that a temperature spread of 10° F. is desired in the product. In this case coil 68 by means of rheostat 67 will be set so that the light beam will fall just to one side of cathode 88 when the spread is at 10°. Now, should the spread increase beyond 10° the resulting increase in temperature differential will increase the electromotive force generated by the thermocouple which in turn will increase the current flow through galvanometer 69 to increase the rotation of coil 68. This will bring the beam of light onto cathode 88, thereby making the cell 73 conductive. This will increase the grid bias (in view of the position of tap 85) to a sufficient extent to decrease the current in the output circuit sufficiently to release armature 92 and close the circuit through solenoid 99. This will open valve 100 to permit additional cooling fluid to flow to chamber 42.

An increase in the flow of cooling fluid to chamber 42 increases the volume of vapors condensed by condensers 35 and consequently the volume of reflux condensate both of which act to decrease the temperature spread.

As soon as the temperature spread has decreased sufficiently the light beam will move to one side of cathode 88 to open the circuit through cell 73. The resulting increase in the current flow in the output circuit will reenergize relay 91 thereby breaking the circuit through solenoid 99 and closing valve 100. This cycle repeats itself continually.

After the device is in operation rheostat 67 may be manipulated as required for finer adjustment.

In view of the high sensitivity of thermocouple and galvanometer circuits, only a very small change in temperature differential is required to open and close valve 100. This sensitivity may be increased by increasing the spacing between the cathode 88 and the mirror 71 since the greater the spacing the smaller will be the arc through which coil 68 must move to focus the light beam on or off of cathode 88.

Since a sample of the product preferably flows continuously and in small amount through the still 56 the overall composition of the components in column 58 will follow closely the overall composition of the product.

Condenser 59 is operated as a partial condenser or as a total condenser to prevent losses.

Tower 10 may be operated at any desired pressure whether atmospheric, subatmospheric or superatmospheric, and column 58 is preferably operated at the same pressure as column 10.

Any other type of valve or other device might be substituted for valve 100, for instance, a valve adapted to increase and decrease its opening, or a device adapted to increase and decrease the pressure causing the flow of cooling fluid, according to requirements. Furthermore, any other circuit might be substituted for that described.

To effect especially rapid heat exchange and to increase the degree of rectification, tubes 35 if desired may be packed, for instance as illustrated at 105, with any suitable packing materials such as raschig rings, jack chain, etc. or with special types of packing elements, for instance the packing elements described and claimed in Patent 2,037,317, granted April 14, 1936.

In order to further increase the rate of heat exchange by the elimination of surface films these packing elements may be joined together and/or to the tube walls.

To increase the rate of heat exchange still further, chamber 42 might also be packed, for instance as illustrated at 106, with any suitable packing materials, and this packing might also be joined into an integral mass and/or to the outer walls of tube 35 to eliminate surface films.

As illustrated, baffles 46 cause the heating fluid to flow through a circuitous course through chamber 42. Any other suitable arrangement may be substituted.

It is simpler to make tubes 11 of the same cross section and length, to provide the same type of contacting means in each tube, to feed vapors to be fractioned at substantially the same rate to each tube, and to cause reflux condensate to form at substantially the same rate in each condenser 35.

However, the individual fractionating units 11 and/or the individual condensers 35 may differ without departing from the spirit of the invention. Such differences may be in construction such as in size, length, contacting means, or otherwise.

For instance, the individual fractionating units 11 and/or their associated condensers 35 may vary as to construction but may be matched so that each condenser 35 will deliver rectified vapors of substantially the same composition when vapors are fed at substantially the same rate to each fractionating unit 11 and reflux condensate is formed at substantially the same rate in each condenser 35.

On the other hand the individual fractionating units 11 and/or the individual condensers 35 may be of the same and/or of different construction but may differ as to capacity. In this case adjustments of the vapor feed to fractionating units 11 and/or of the condensing capacity of condensers 35 may be made to cause the rectified vapors leaving any condenser 35 to be of at least substantially the same composition as the rectified vapors leaving any other condenser 35.

The use of metering tubes 28 makes it possible to adjust the feeding rate of vapors to any fractionating unit 11 by employing a metering tube for that unit of the desired capacity. Likewise, the condenser 35 for any fractionating unit may be especially constructed to have the desired condensing capacity.

Thus the desired balance may be obtained. The precision of this balance will, of course, depend upon the results desired and, therefore, may be rough or close according to requirements.

Other variations are possible. For instance, if fractionating units 11 are of the same cross section and together with their associated condensers are equally matched as to pressure drop, section A may be omitted entirely. The ascending vapors, due to the uniformity of pressure drop, will divide equally between the various tubes 11.

However, should there be differences in pressure drop when section A or a device of equivalent function is omitted, this might be compensated for by adjusting the condensing capacity of individual condensers 35 to adjust the quantity of reflux condensate descending into the individual tubes 11 to obtain rectified vapors of at least substantially the same composition from each condenser 35.

If the tubes 11 are of different cross sectional area when section A is omitted the pressure drops through the individual tubes or the reflux condensate descending into the individual tubes or both might be adjusted to obtain rectified vapors from each condenser 35 of the desired composition.

Other possible variations will suggest themselves to persons skilled in the art upon becoming familiar with this invention.

As previously described, adjustments of rheostat 67 are made to obtain a product of the desired temperature spread. In order to facilitate the adjustment of rheostat 67 a second thermocouple 108 might be inserted in column 58 with junctions 109 and 110 positioned similarly to junctions 61 and 62. Thermocouple 108 might operate a meter 111 calibrated to read directly in degrees of temperature spread.

While in the particular description the product is withdrawn as vapor, it is to be understood that any other means known in the art may be employed for the separation of product.

Although the feed into the tower has been shown at the bottom thereof, the feed may be at any other point or points and may be in the vapor or liquid phase according to the type and point of feed. The feed material would be, of course, preferably metered into the fractionating units 11 following the principles of feed discussed above.

Valve 100 or any other device broadly producing a similar result might be employed for controlling any other means for varying the condensing effect of condensers 35. For instance, valve 100 might be employed in a line for leading a relatively colder solution into line 103 so as to make the device more sensitive.

Instead of the fluid entering chamber 42 being such that it absorbs only sensible heat, that is, it only rises in temperature as it flows through condenser section CC, this fluid may be so chosen that it undergoes evaporation or boiling about tubes 35 so that the cooling of tubes 35 is principally due to vaporization of the fluid. These vapors then pass out at upper opening 43 of shell 41 to a vapor liquefier such as condenser and/or compressor (not shown) and are liquified and let back into line 103 to repeat the cycle.

In this type of operation baffles 46 are preferably removed. A liquid of suitable boiling point is introduced into chamber 42 and its boiling point is so chosen that this liquid is boiled by vapor condensing inside of tubes 35. This liquid while boiling preferably stands at a reasonable height above tube sheet 38, so that it completely surrounds all tubes 35, and there is local boiling about each tube 35 thereby effecting condensation of vapors in each tube 35. The vapors of this boiling liquid pass up around tubes 35 and out of chamber 42 into a vapor liquefier (not shown) where they are liquefied and returned as liquid to 103. The amount of this liquid introduced about tubes 35 is controlled by valve 102 and electrically operated valve 100.

Valve 100 automatically keeps the desired amount of liquid standing above tube sheet 38. Increasing the height of liquid standing above tube sheet 38 and surrounding tubes 35 condenses more vapors to liquid inside tubes 35 thereby increasing the reflux ratio in the column as a whole assuming the rate of vapor entry to chamber 18 is constant. This will decrease the temperature spread and in turn the amount of fluid flowing through valve 100.

This cycle repeats itself continually and by proper adjustment the desired height of liquid in chamber 42 may be maintained.

Reducing the height of liquid about tubes 35 condenses less in these tubes lowering the reflux ratio in the column as a whole on the basis that a constant inflow of vapors enters 18. This will increase the temperature spread and in turn the amount of fluid flowing through valve 100.

In this way the fractionating column 10 is made to function to produce the desired product whether the operation be batch or continuous.

Again, a separate liquid might flow through 100 and another liquid flow through 102, both these liquids mixing and flowing into chamber 42 where they are vaporized as before. A higher boiling liquid may flow through 102 and a lower boiling one through 100. The flow of higher boiling liquid is such that it produces the lowest reflux that is desired for operation of column 17 while the total possible flow (if valve 100 were open) of low boiling liquid through valve 100 is such that it produces the highest reflux desired for operation of column 17. Valve 100 then intermittently operates to give a liquid mixture of suitable boiling point to enable the desired reflux to be obtained so producing the desired type of product escaping from 49.

The mixed vapors escaping from chamber 42 are then led to a fractionating column (not shown) which resolves this mixture into the two liquids which are then separately returned to valves 100 and 102 to repeat the cycle.

Thus, there is ample means of employing the control mechanism to condense the desired amount of vapors inside tubes 35.

Condensers 35 and/or chamber 42 or their equivalent might be constructed in any other manner. For instance, condensers 35 might be separately encased to form separate cooling chambers into each of which the cooling fluid might be metered particularly if it is desired to individually control the condensing capacity of the condensers 35.

Likewise, any other device performing the function of the control mechanism for valve 100 or its equivalent might be substituted.

For instance, any other means for measuring the temperature spread of the product might be substituted to control the vacuum tube circuit operating valve 100 or any other type of control for the fluid entering chamber 42 might be employed.

While a tower has been particularly described herein it is to be understood that the invention in its broad phases covers a tower of any construction to which the invention might be adapted.

It is to be understood that tower 10 might be varied in construction, for instance, for delivering one or more side streams.

It should be noted that in the form shown each individual contacting unit is in heat exchange relationship with each other individual contacting unit so that heat equilibrium is possible.

Furthermore, it is possible to feed vapors from a still or other source into the heat exchange chamber to attain uniformity and control of temperature about the contacting units.

Many other variations are possible.

While a particular form of tower and control mechanism have been shown and described it is to be understood that the invention is capable of broad application.

The tower might be employed for the contacting of liquid phases, for instance, by introducing a solution of solvent and oil into the tower in place of the vapors and by precipitating oil from the solution by cooling the solution in the condenser section. Due to a difference in density the precipitate will flow through the tower countercurrently to the solution much the same as condensate in the case of distillation. The solution remaining after the precipitation might be run through a colorimeter having its light adjusted so as to fall upon the photoelectric cell of the circuit disclosed in the drawings. This circuit might then be adjusted so as to increase the cooling effect of the condenser section to cause greater reflux with increase in transparency of the solution and to decrease the cooling effect to cause less reflux with decrease in transparency of the solution thus controlling the composition of the extract in solution.

The solution might be stripped of a part or all of the solvent prior to passing through the colorimeter.

Such an arrangement would be particularly useful in processing lubricating oil derived from Pennsylvania grade crude since the color of the extract in such cases varies rapidly.

The control might also be made to follow the viscosity at any desired temperature, for instance at 100° F. of either the raffinate or the extract since both vary rapidly in viscosities with change in percentage of extract. This might be accomplished, for instance by stripping either the extract or raffinate of solvent and forcing the oil by means of a constant displacement pump through a capillary at the desired temperature. The control might then be operated by the pressure drop across the capillary to control the cooling effect of the condenser and consequently the composition of the extract.

The raffinate, of course, will be that oil portion which is removed from the tower as reflux.

In the foregoing it will be understood that the tower will be constructed with the condenser at the top when the solution is lighter than the oil separated by the condenser and will be constructed with the condenser at the bottom when the solution is heavier than the oil separated by the condenser.

Many other modifications might be made.

The term "adiabatic conditions" as used in the claims is intended to define conditions of an isolated thermodynamic system arranged such that for practicable purposes no heat enters or leaves it. The term, therefore, includes not only true adiabatic conditions but also substantially adiabatic conditions as realized in practice.

Having particularly described the invention, it is to be understood that changes, omissions, additions, substitutions and/or modifications might be made therein within the scope of the claims without departing from the spirit thereof.

I claim:

1. A process for fractionating a mixture comprising, flowing said mixture in the vapor phase through a plurality of fractionating units countercurrently to a liquid phase while maintaining said fractionating units under adiabatic conditions, separately subjecting the rectified vapors produced by each individual fractionating unit to fractional condensation in an individual condenser to produce said liquid phase for said individual fractionating unit, combining the remaining uncondensed vapors to produce the product, and increasing and decreasing the volume of condensate formed by said individual condensers with increase and decrease of the temperature spread of said product about the desired value.

2. A process for fractionating a mixture comprising, flowing said mixture in the vapor phase through a plurality of fractionating units of relatively small cross sectional area countercurrently to a liquid phase while maintaining said fractionating units under adiabatic conditions, separately subjecting the rectified vapors produced by each individual fractionating unit to fractional condensation in an individual condenser to produce said liquid phase for said individual fractionating unit, combining the remaining uncondensed vapors to produce the product, and increasing and decreasing the volume of condensate formed by said individual condensers with increase and decrease of the temperature spread of said product about the desired value.

3. A process for fractionating a mixture comprising, flowing said mixture in the vapor phase through a plurality of fractionating units counter-currently to a liquid phase while maintaining said fractionating units under adiabatic conditions, separately subjecting the rectified vapors produced by each individual fractionating unit to fractional condensation in an individual condenser to produce said liquid phase for said individual fractionating unit, combining the remaining uncondensed vapors to produce the product, and increasing and decreasing the volume of condensate formed by said individual condensers with increase and decrease of the temperature spread of said product about the desired value by separately fractionating a sample of said product and measuring change in temperature spread through change in differential of composition of materials concentrated at different points in said last mentioned fractionating zone.

4. A process for fractionating a mixture comprising, flowing said mixture in the vapor phase through a plurality of fractionating units of relatively small cross sectional area countercurrently to a liquid phase while maintaining said fractionating units under adiabatic conditions, separately subjecting the rectified vapors produced by each individual fractionating unit to fractional condensation in an individual condenser to produce said liquid phase for said individual fractionating unit, combining the remaining uncondensed vapors to produce the product, and increasing and decreasing the volume of condensate formed by said individual condensers with increase and decrease of the temperature spread of said product about the desired value by separately fractionating a sample of said product and measuring change in temperature spread through change in differential of composition of materials concentrated at different points in said last mentioned fractionating zone.

5. Apparatus comprising a plurality of individual fractionating units, an individual partial condenser for each fractionating unit, means common to said condensers for controlling the condensing capacity thereof, means for sampling the combined product produced by said individual fractionating units and partial condensers, and means for controlling said first mentioned means through said second mentioned means.

6. Apparatus comprising a plurality of individual fractionating units of relatively small cross sectional area, an individual partial condenser for each fractionating unit, means common to said condensers for controlling the condensing capacity thereof, means for sampling the combined product produced by said individual fractionating units and partial condensers, and means for controlling said first mentioned means through said second mentioned means.

7. Apparatus comprising a plurality of individual fractionating units of relatively small cross sectional area, said fractionating units being of at least substantially equal capacity and efficiency, an individual partial condenser for each fractionating unit, said partial condensers being of at least substantially equal capacity and efficiency, means for supplying cooling fluid at least substantially equally to said partial condensers, means for combining the vapors escaping from said partial condensers to produce the product, means for separately fractionating a sample of said product, and means responsive to increase and decrease in differential of composition of materials concentrated in different sections of the fractionating zone of said last mentioned means for respectively increasing and decreasing the cooling rate of said cooling fluid.

8. A process for fractionating a mixture comprising, flowing said mixture in the vapor phase through a plurality of fractionating units countercurrently to a liquid phase while maintaining said fractionating units under adiabatic conditions, separately subjecting the rectified vapors produced by each individual fractionating unit to fractional condensation in an individual condenser to produce said liquid phase for said individual fractionatng unit, combining the remaining uncondensed vapors to produce the product, increasing and decreasing the volume of condensate formed by said individual condensers with increase and decrease of the temperature spread of said product about the desired value, and maintaining the individual fractionating units in heat exchange relationship with each other so as to at least approach heat equilibrium between said units.

9. Apparatus comprising a plurality of individual fractionating units, an individual partial condenser for each fractionating unit, means common to said condensers for controlling the condensing capacity thereof, means for sampling the combined product produced by said individual fractionating units and partial condensers, means for controlling said first mentioned means through said second mentioned means, and means for holding said individual fractionating units in heat exchange relationship with each other.

MERRELL R. FENSKE.